United States Patent
Hall et al.

(10) Patent No.: US 12,227,270 B2
(45) Date of Patent: Feb. 18, 2025

(54) CONTROL CONSOLE FOR PERSONAL WATERCRAFT

(71) Applicant: Taiga Motors Inc., Lasalle (CA)

(72) Inventors: Daniel Hall, Lasalle (CA); Moran Lecalonnec, Lasalle (CA); William Champagne, Lasalle (CA); Sergio Mora, Lasalle (CA); Paul Achard, Lasalle (CA); Paul Bruneau, Lasalle (CA)

(73) Assignee: Taiga Motors Inc., Lasalle (CA)

( * ) Notice: Subject to any disclaimer, the term of this patent is extended or adjusted under 35 U.S.C. 154(b) by 469 days.

(21) Appl. No.: 17/742,936

(22) Filed: May 12, 2022

(65) Prior Publication Data

US 2022/0371700 A1    Nov. 24, 2022

Related U.S. Application Data

(60) Provisional application No. 63/190,114, filed on May 18, 2021.

(51) Int. Cl.
*B63B 34/10* (2020.01)
(52) U.S. Cl.
CPC .................................. *B63B 34/10* (2020.02)
(58) Field of Classification Search
None
See application file for complete search history.

(56) References Cited

U.S. PATENT DOCUMENTS

| | | | | |
|---|---|---|---|---|
| 7,140,314 B2* | 11/2006 | Kamio | .................... | B63B 34/10 |
| | | | | 440/2 |
| 10,919,608 B1* | 2/2021 | Kunanec | ................ | B63H 11/08 |
| 11,787,510 B2* | 10/2023 | Hutchins | ................ | B63B 17/00 |
| | | | | 114/354 |
| 2005/0235894 A1* | 10/2005 | Hattori | .................... | B63B 34/10 |
| | | | | 114/144 R |
| 2007/0171315 A1* | 7/2007 | Aoyama | ................. | G01S 19/19 |
| | | | | 342/357.57 |
| 2010/0077953 A1* | 4/2010 | Simard | .................... | B63B 34/10 |
| | | | | 114/55.5 |
| 2020/0001953 A1* | 1/2020 | Vachon | .................. | B63H 11/04 |
| 2023/0007882 A1* | 1/2023 | Bruneau | ................ | B63H 21/17 |
| 2024/0009602 A1* | 1/2024 | Araki | ..................... | B01D 29/56 |
| 2024/0253746 A1* | 8/2024 | Tian | ........................ | B63B 32/77 |

\* cited by examiner

*Primary Examiner* — S. Joseph Morano
*Assistant Examiner* — Jovon E Hayes
(74) *Attorney, Agent, or Firm* — Dicke, Billig & Czaja, PLLC

(57) ABSTRACT

One example provides a control console for a personal watercraft, the console including a console housing. The console housing includes a lower shroud to couple to a handlebar of a steering assembly of the personal watercraft, and an upper shroud to couple to the lower shroud, the console housing to be disposed between opposing grip ends of the handlebar. A display device is mounted to the console housing and being externally visible, the display device to display information, including operational information of the personal watercraft.

21 Claims, 15 Drawing Sheets

CONTROL CONSOLE FOR PERSONAL WATERCRAFT

CROSS-REFERENCE TO RELATED APPLICATIONS

The application claims priority from U.S. Provisional Patent Application No. 63/190,114, filed May 18, 2021, the contents of which are incorporated by reference in their entirety herein.

FIELD OF THE INVENTION

This disclosure relates generally to personal watercraft vehicles.

BACKGROUND

Personal watercraft continue to grow in popularity. For ease of use and safety during operation, control features of the personal watercraft should be readily accessible to an operator.

SUMMARY

One example provides a control console for a personal watercraft, the console including a console housing having a lower shroud to couple to a handlebar of a steering assembly of the personal watercraft, and an upper shroud to couple to the lower shroud, the console housing to be disposed between opposing grip ends of the handlebar. A display is device mounted to the console housing and being externally visible, the display device to display information, including operational information of the personal watercraft.

One example provides a personal watercraft including a hull, a deck disposed on the hull, and a steering assembly including a steering column having a distal end disposed within the hull in operational communication with a propulsion system, and a proximal end extending from the deck, and a handlebar mounted to the proximal end of the steering column between opposing grip ends of the handlebar. A control console includes a lower shroud selectively coupled to the handlebar between the opposing grip ends, the lower shroud disposed between the handlebar and the deck, and an upper shroud selectively coupled to the lower shroud to form a console housing defining an interior space through which the handlebar passes. A display device is mounted to the upper shroud to display information including operating information of the personal watercraft.

Additional and/or alternative features and aspects of examples of the present technology will become apparent from the following description, the accompanying drawings, and the appended claims.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Personal watercraft (PWC) continue to grow in popularity. Typically, a PWC includes a jet propulsion system to create a pressurized jet of water which creates thrust to propel the PWC through the water. The water jet is ejected from a rear of the watercraft via a pivoting steering which is directionally controlled by a user operated steering mechanism to provide a directionally controlled jet of water to propel and steer the PWC. Traditionally, PWC have been powered by internal combustion engines. However, due to their quieter and cleaner drive systems, electric PWC represent an environmentally friendly alternative to traditional combustion-powered PWC.

For ease of use and safety during operation, control features of personal watercraft should be readily available and accessible to an operator. Such control features may include control mechanisms (e.g., switches, buttons, levers) to control various aspects of the PWC (e.g., start/stop, throttle, trim) and display devices (e.g., gauges, screens) for displaying current PWC operating parameters (e.g., speed, RPM, range). In some PWC, display devices are placed forward of a steering mechanism (e.g., handlebars). However, during operation, such display devices may sometimes be difficult to view for any number of reasons, such as by being obstructed by the steering mechanism due to the driver's position at a given moment, for example. In other cases, display devices may be positioned between an operator and the steering mechanism. However, with such placement, in order to view the display, an operator may have to temporarily divert their focus from a path of travel, thereby creating a potential safety hazard.

Figure 1A:
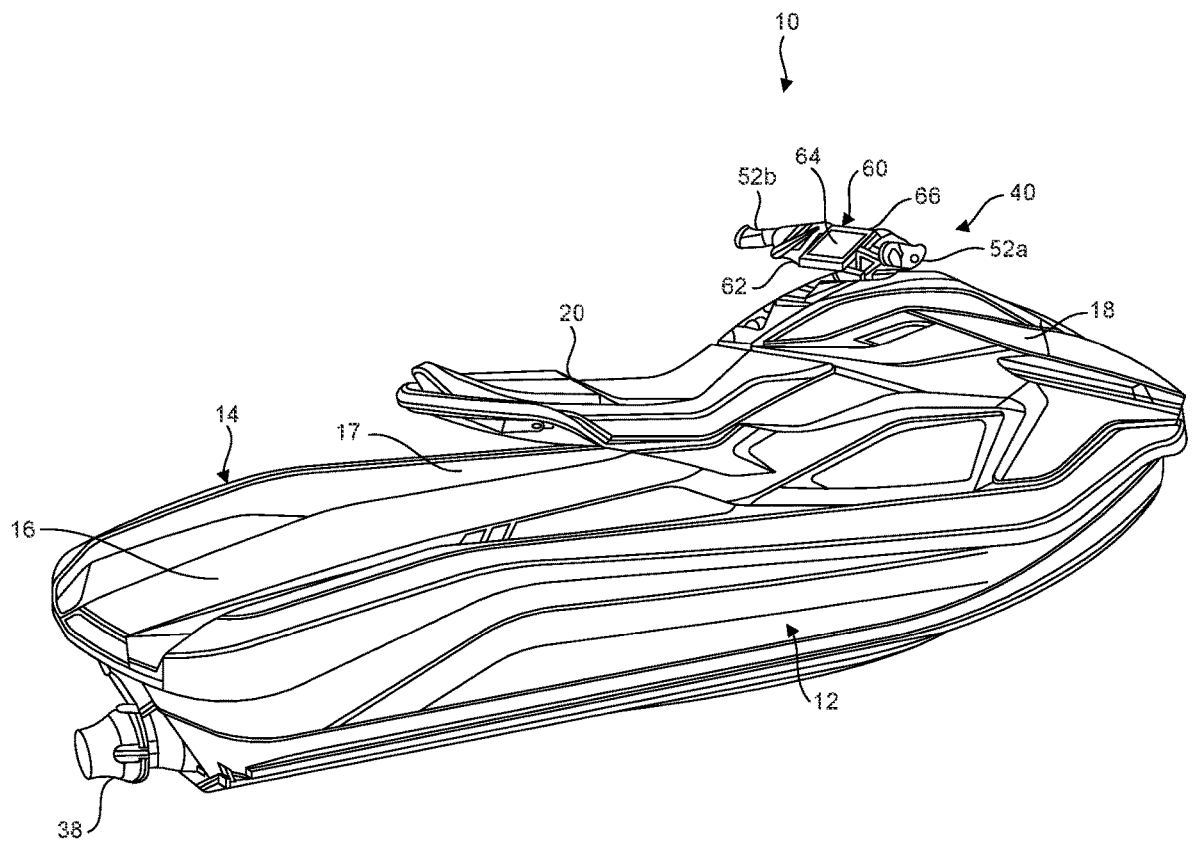
FIG. 1A is a perspective view generally illustrating a personal watercraft including a control console, according to one example.
Figure 1B:
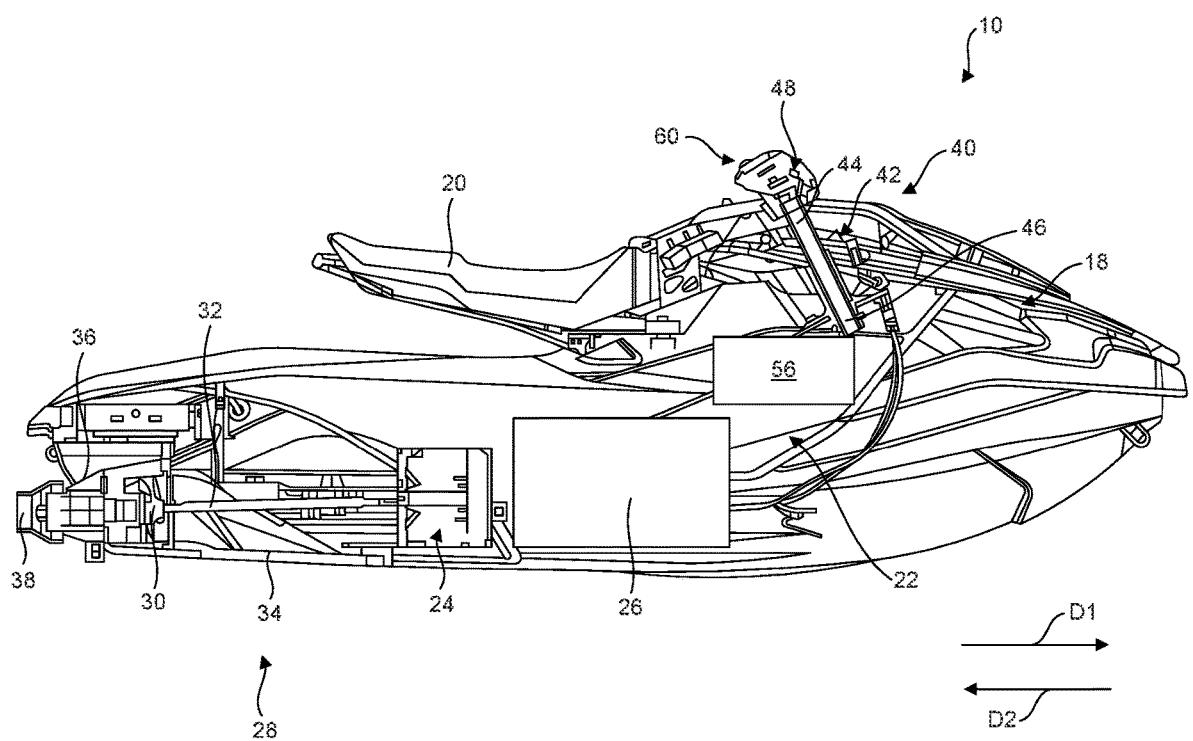
FIG. 1B is a cross-sectional side view generally illustrating a personal watercraft including a control console, according to one example.

FIGS. 1A and 1B respectively illustrate perspective and cross-sectional side views of a PWC 10 employing a control console 60 mounted to a steering assembly 40 of PWC 10, in accordance with the present disclosure. PWC 10 includes a hull 12, which is to be partially submerged in water and provide buoyancy, and a deck 14 sealably secured to hull 12 and defining an upper portion of PWC 10. In one example, deck 14 defines a rear platform 16 (which enables boarding from the water), footwells 17, and a raised forward body 18. In one example, a straddle seat 20 is secured to deck 14 (e.g., extending from raised forward body 20) and extends above footwells 17 and portions of rear platform 16. In examples, straddle seat 20 is sized to accommodate a driver and, optionally, one or more passengers. In examples, an interior volume 22 formed by hull 12 and deck 14 accommodates a number of components of PWC 10 including, but not limited to, an electric motor 24, a number of batteries 26, and one or more storage compartment, for example. Additionally, hull 12 may also include stakes and chines to provide, at least in part, riding and handling characteristics of PWC 10.

A jet propulsion system 28 is driven by electric motor 24 and batteries 26 to create a pressurized jet of water which provides thrust to propel PWC 10 through the water. Jet propulsion system includes an impeller 30 drivingly engaged to electric motor 24 via a drive shaft 32. When driven by electric motor 24, impeller 30 draws water through an intake 34 on an underside of hull 12. The water is forced through a venturi 36, which further accelerates the water to provide additional thrust. The accelerated water is ejected from venturi 36 through a pivoting steering nozzle 38 which is controlled by a driver via a steering assembly 40 to provide a directionally controllable jet of water to propel and steer PWC 10. In some examples, steering nozzle 38 may be directed upward and downward to provide trim control to PWC 10. A trim angle of steering nozzle 38 may be controlled by a driver via inputs on control console 60.

In examples, steering assembly 40 includes a steering column 42 having a proximal end 44 extending from raised forward body 18 in a forward direction D1 from seat 20, and a distal end 46 disposed within internal volume 22 which is in operational communication with steering nozzle 38. Steering assembly 40 further includes a handlebar assembly 48 coupled to proximal end 44 of steering column 42, with handlebar assembly 48 further including a handlebar 50 (e.g., see FIG. 3B) having opposing right- and left-hand grip ends 52a and 52b. In examples, handlebar assembly 48 and steering column 42 pivot together about a longitudinal axis 43 of steering column 42 to control a direction of pivoting steering nozzle 38.

Control console 60, in accordance with the present disclosure, is coupled to handlebar assembly 48 (such as to handlebar 50, see FIG. 3B) and pivots together with handlebar assembly 48 and steering column 42 about longitudinal axis 43 of a steering column 42. In one example, housing 62 is disposed between (e.g., centered between) opposing right- and left-hand grip ends 52a and 52b of handlebar assembly 48. In examples, control console 60 includes a housing 62 which forms a shroud about portions of handlebar assembly 48.

An externally visible display device 64 is mounted to housing 62 to display information to an operator (e.g., a driver of PWC 10), such as operational information (e.g. speed). In one example, display device 64 is a digital display screen 64, such as a liquid crystal display (LCD), light emitting diode display (LED), plasma (PDP) display, and a quantum dot (QLED) display, for example. In examples, as will be described in greater detail below (e.g., see FIG. 2A), in addition to display device 64, control console 60 includes plurality of control mechanisms 66 (such as a throttle control lever, a brake control lever, a mode control toggle switch, a trim up/down toggle switch, a power button, and a cruise control button, for example), where control mechanisms 66 are disposed on or in housing 62 so as to be readily operable without operators needing to remove their hands from right- and left-hand grip ends 52a and 52b.

In one example, control mechanisms 66 of control console 60 serve as inputs to a control system, including one or more controllers 56 (referred to hereinafter in the singular), for controlling operation of PWC 10. In examples, controller 56 is operable to modulate an electrical output transmitted from batteries 26 to electric motor 24 as a function of signals received from at least a portion of control mechanisms 66 of control console 60, among others. In examples, based on inputs from control console 60, controller 132 is operable to control a torque or rotational speed, and thus a thrust, of impeller 30, as well as a direction of rotation of electric motor 24 to propel PWC 10 in one of forward direction D1 and a rearward direction D2.

By mounting control console 60 on handlebar assembly 48 so as to be pivotal therewith, in accordance with the present disclosure, display screen 64 and control mechanisms 66 remain easily viewable and readily accessible by an operator under all operating conditions, thereby enhancing the ease of use and safety of PWC 10.

Figure 2A:
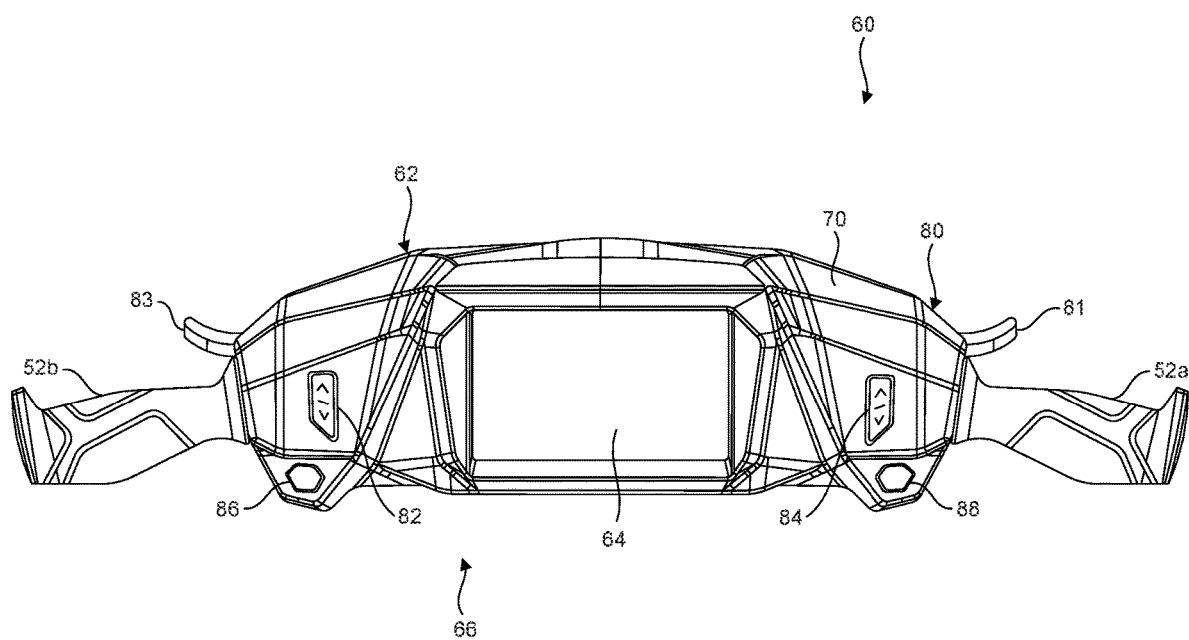
FIGS. 2A and 2B respectively illustrate top and bottom views of a control console, according to one example.
Figure 2B:
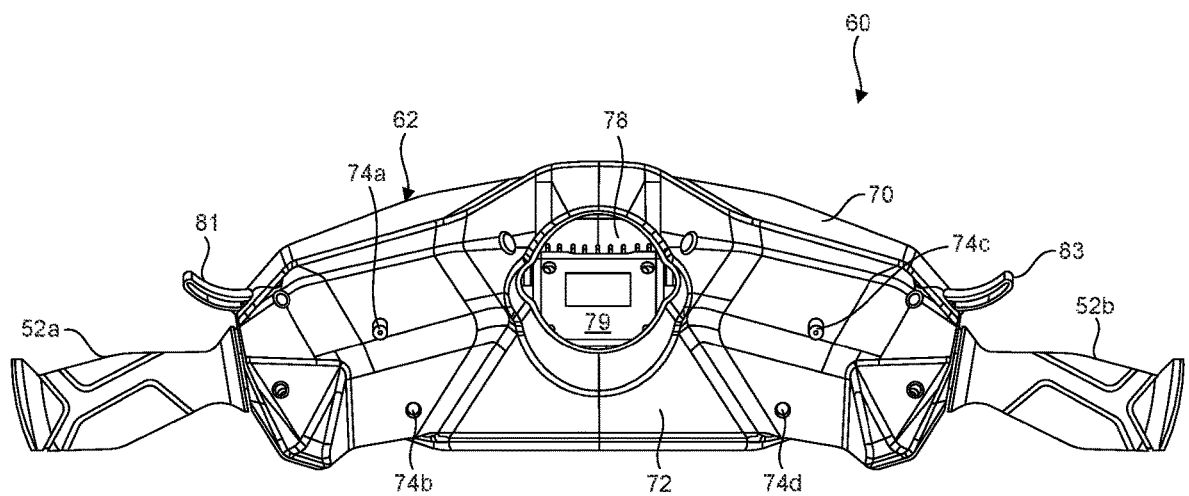

FIGS. 2A and 2B respectively illustrate top and bottom views of control console 60 with housing 62 implemented to form a shroud about portions of handlebar assembly 48 between opposing right and left-hand grip ends 52a and 52b, according to one example. In one example housing 62 includes an upper shroud 70 and a lower shroud 72 which are selectively fastened to one another to enclose portions of handlebar assembly 48 between right and left hand grip ends 52a and 52b. In one example, as will be described in greater detail below, lower shroud 72 is selectively attached to handlebar assembly 48 and upper shroud 70 is selectively attached to lower shroud 72. In another example, both upper shroud 70 and lower shroud 72 are selectively attached to handlebar assembly 48. In one example, upper should 70 is selectively attached to lower shroud 72 via a plurality of screws 74 (illustrated as screws 74a-74d) extending through lower shroud 72, from an exterior surface 76 thereof, and into upper shroud 70. It is noted that upper shroud 70 may be selectively secured to lower shroud 72 in any suitable fashion such as spring clips, fasteners extending through upper shroud 70 into lower shroud 72, for example. In one example, lower shroud 72 includes an aperture 78 extending there through into an interior volume formed when selectively connected to upper shroud 70, with aperture 78 to receive proximal end 44 of steering column 42.

In one example, display screen 64 is mounted to upper shroud 70. In one example, display screen 64 is secured to an inner surface of upper shroud 70. In one example, display screen 64 is secured to an inner surface of lower shroud 70. In one example, in addition to display screen 64, some or all of control mechanisms 66 are mounted to upper shroud 70. In one example, control mechanisms 66 include a throttle 80 (including throttle lever 81) for controlling the speed of PWC 10, a brake-reverse assembly 85 (including brake-reverse lever 83) for slowing down and/or reversing the PWC 10, mode selector toggle buttons 82 (e.g., to toggle between various operating modes of PWC 10 such as eco, standard, and sport modes), trim control toggle buttons 84 (e.g., to control a trim up/down of steering nozzle 38), a power button 86 (to turn PWC 10 on/off), and a cruise control button 88 (to turn cruise control on/off). In examples, throttle 80 is a drive-by-wire throttle and brake-reverse assembly is also drive-by-wire. It is noted that the type of control mechanisms and their locations on control console 60 represent an illustrative example, and that any number of different types of control mechanisms may be employed at any number of various locations on control console 60.

Figure 3A:
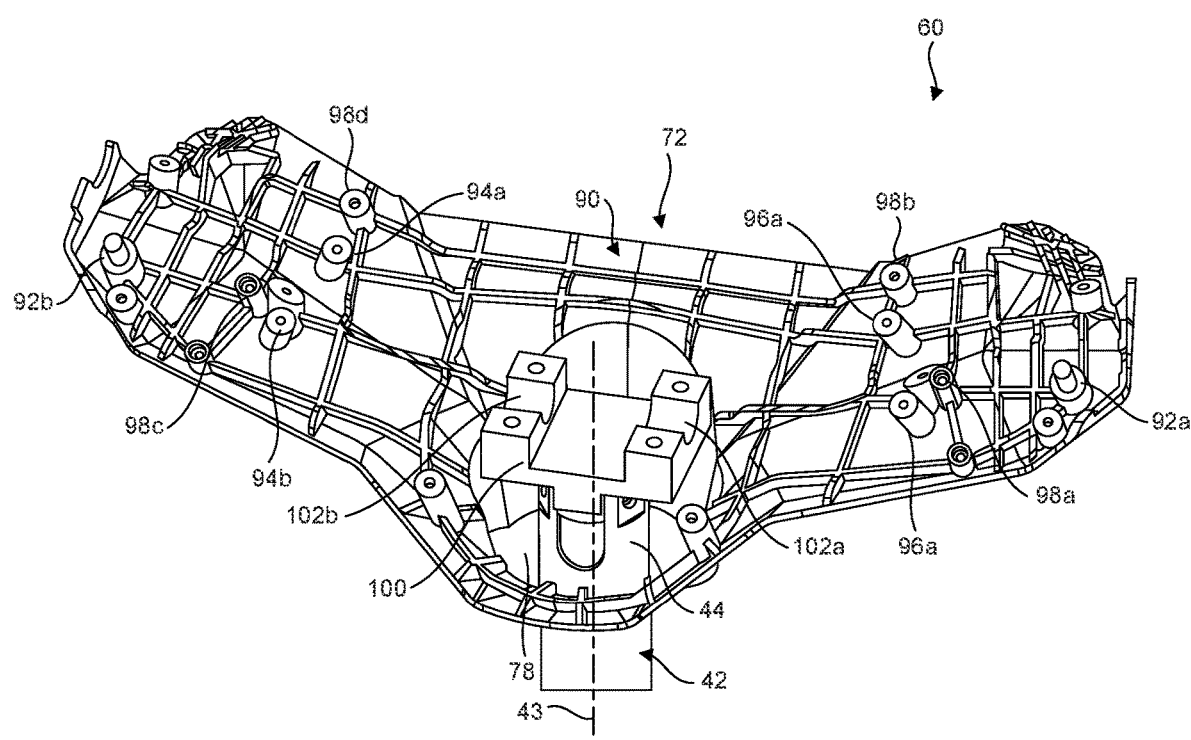
FIGS. 3A and 3B are perspective views generally illustrating mounting of a lower shroud to a handlebar of a steering assembly, according to one example.
Figure 3B:
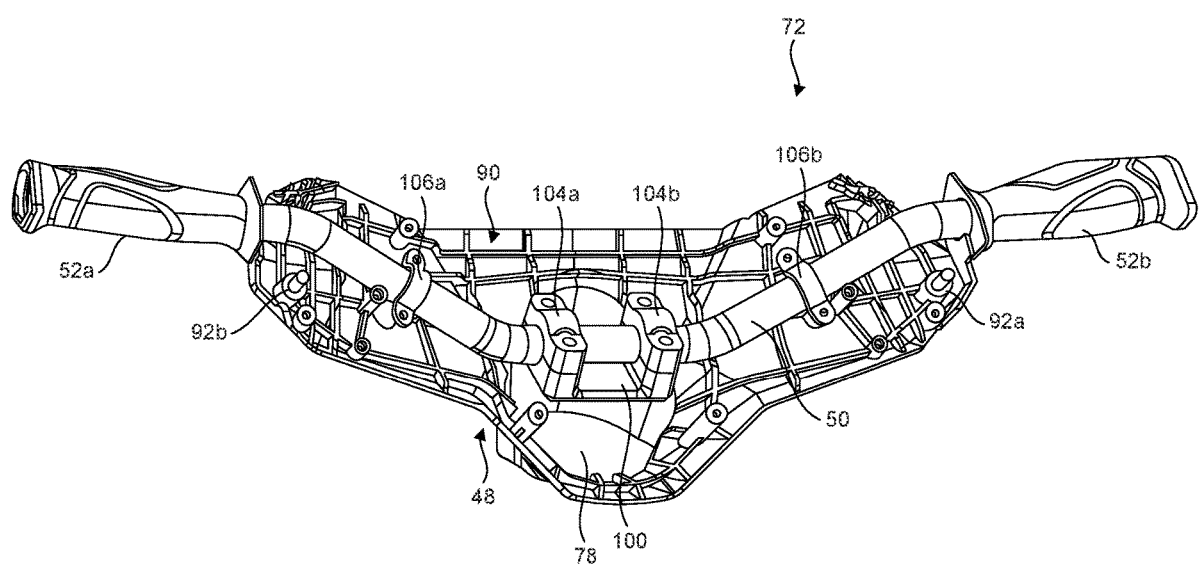

FIGS. 3A and 3B are perspective views generally illustrating a mounting of lower shroud 72 to steering assembly 40, according to one example. In one example, an inner surface 90 of lower shroud 72 includes a pair of alignment pins 92a and 92b extending therefrom which are to be received by corresponding alignment holes in upper shroud 70 so as to align upper shroud 70 with lower shroud 72 when being mounted thereto. As described below by FIG. 4, a first pair of screw posts 94a, 94b and a second pair of screw posts 96a, 96b are to receive fasteners for attaching lower shroud to a handlebar 50 of handlebar assembly 48. A number of screw posts 96a to 96d are to receive corresponding screws 74a to 74d extending through lower shroud 72 to selectively secure upper shroud 70 to lower shroud 72.

As illustrated, aperture 78 receives proximal end 44 of steering column 42, such that proximal end 44 is disposed within interior volume 79 of housing 62 when upper shroud 70 is coupled to lower shroud 72 (see FIG. 2B). In one example, handle bar assembly 48 includes a handlebar mount 100 fixedly attached to proximal end 44 of steering column 42, with handlebar bar mount 100 including a pair of saddles 102a and 102b to receive handlebar 50. With reference to FIG. 3B, handlebar 50 is disposed in saddles 102a and 102b and a corresponding pair of handlebar brackets 104a and 104b are fastened to handlebar mount 100 to secure handlebar 50 thereto. Lower shroud 72 is secured to handlebar 50 by a second pair of handlebar brackets 106a and 106b which are fastened to corresponding screw posts 96a and 96b.

In one example, after being secured to handlebar 50, lower shroud 72 is disposed between handlebar 50 and deck 14 of PWC 10 (e.g., see FIG. 1A). When upper shroud 70 is connected to lower shroud 72, handlebar 50 passes through interior volume 79 of control console housing 62 (e.g., see FIGS. 2A and 2B). It is noted that, in addition to that illustrated by FIGS. 3A and 3B, any number of suitable techniques may be employed to mount handlebar 50 to steering column 42, and to mount lower shroud 72 to handlebar assembly 48.

Figure 4A:
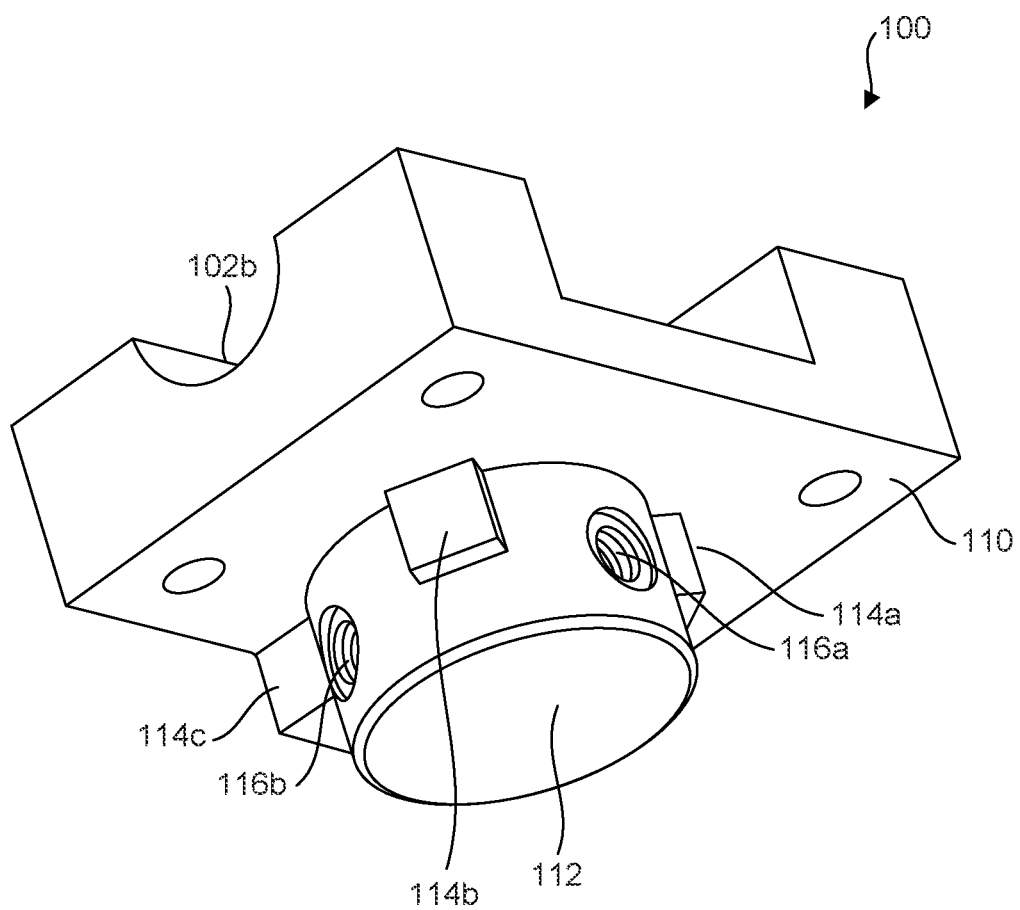
FIG. 4A is a bottom perspective view of a handlebar mount, according to one example.
Figure 4B:
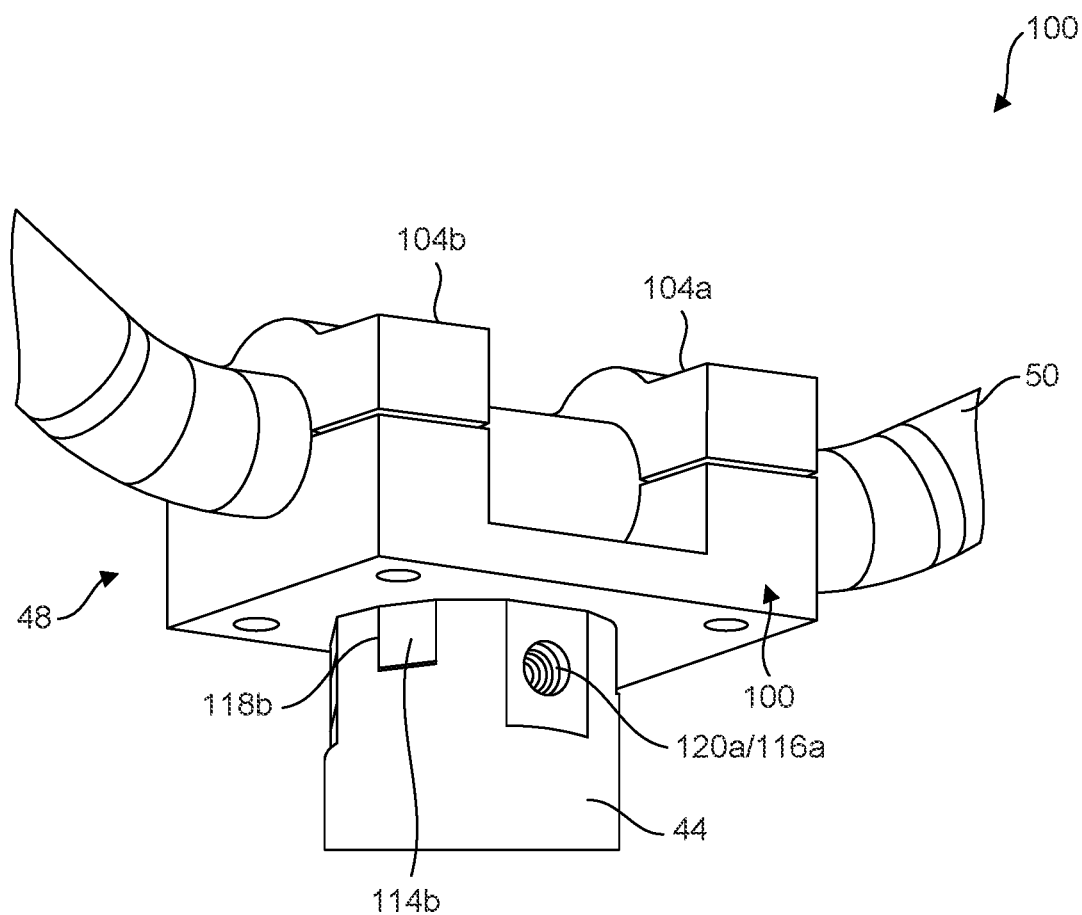
FIG. 4B is a perspective view illustrating a handlebar mount selectively attached to a steering column, according to one example.

FIGS. 4A and 4B respectively illustrate a bottom perspective view of one example of a handlebar mount 100 and a perspective view of handlebar mount 100 attached to proximal end 44 of steering column 42. In one example, handlebar mount 100 includes a bottom surface 110 having a flange 112 extending therefrom (e.g., a cylinder flange) which is configured to insert within hollow steering column 42. In one example, flange 112 includes a plurality of key flanges 114, such as illustrated by key flanges 114a-114c, and a plurality of threaded openings 116, such as illustrated by threaded openings 116a and 116b. With reference to FIG. 4B, when flange 112 is inserted within hollow steering column 42, key flanges 114 are received within corresponding key slots 118 in a sidewall of steering column 42, such as illustrated by key flange 114a being received within key slot 118b, and threaded openings 116 align with trough holes 120 in steering column 42, such as through hole 120a aligning with threaded opening 116a. In one example, a bolt (not illustrated) is threaded into threaded openings 116 via through hole 120 such that the bolts key flanges/slots 114/118 fixedly secure handlebar mount 100 to steering column 42 and prevent rotational movement therein.

Figure 4C:
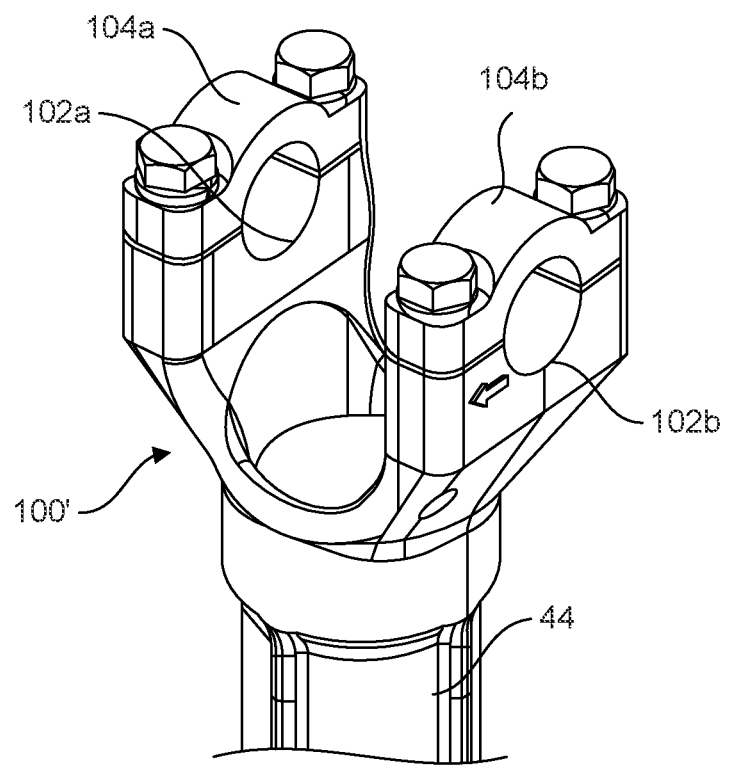
FIG. 4C is a perspective view illustrating a handlebar mount with a bottom portion integrally formed with a steering column, according to one example.

FIG. 4C illustrates a perspective view of one example of a handlebar mount 100' fixed to a proximal end 44 of steering column 42. In this example, handlebar mount is integrally formed with proximal end 44 of steering column 42. Similarly to handle bar mount 100, handlebar mount 100' includes a pair of saddles 102a and 102b to receive handlebar 50 and a corresponding pair of handlebar brackets 104a and 104b that can be fastened to handlebar mount 100' to secure handlebar 50 thereto.

Figure 5A:
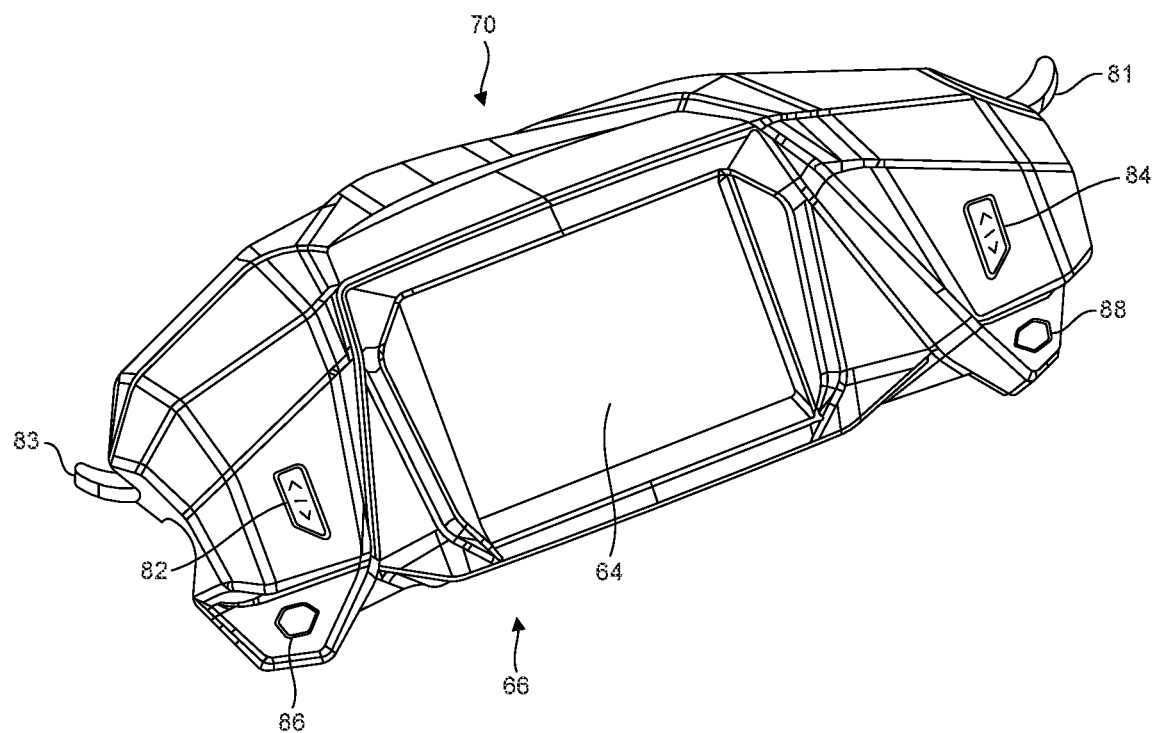
FIGS. 5A and 5B respectively illustrate top and bottom views of an upper shroud, according to one example.
Figure 5B:
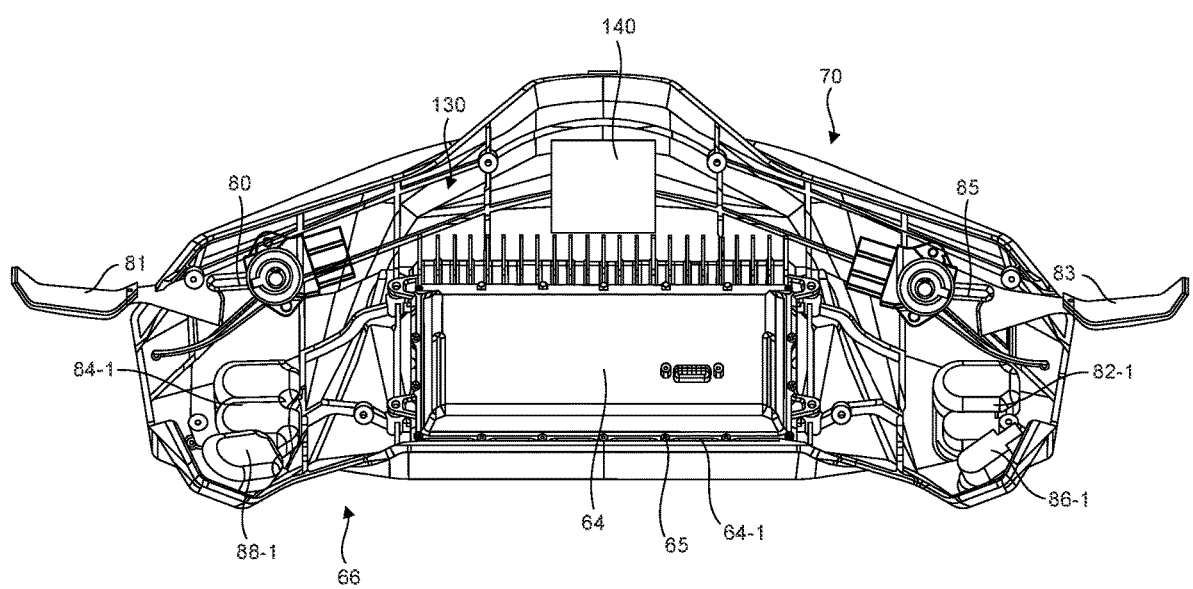

FIGS. 5A and 5B respectively illustrate exterior and interior views of upper shroud 70, according to one example. With reference to FIG. 5B, throttle assembly 80, brake-reverse assembly 85, button assembly 82-1 (including mode select toggle buttons 82), button assembly 84-1 (including trim control toggle buttons 84), button assembly 86-1 (including power button 86), and button assembly 88-1 (including cruise control button 88) are mounted to an interior surface 130 of upper shroud 70. In one example, an input controller 140 is also mounted to interior surface 130 where, as described in greater detail below (see FIG. 6), input controller 140 converts data inputs from button assemblies 82-1, 84-1, and 86-1 to a data format compatible with a control network employed by PWC 10 (e.g., a controller area network (CAN)). In examples, upper shroud 70 includes corresponding openings such that when display 64 and button assemblies 82-1, 84-1, 86-1, and 86-1 are mounted to interior surface 130, the display screen, mode select toggle buttons 82, trim control toggle buttons 84, power button 86, and cruise control button 88 are accessible from exterior surface 129. In examples, display 64 is mounted to interior surface 130 of upper shroud 70 via a plurality of fasteners, such as a plurality of screws 65 extending through a flange 64-1 extending about a perimeter of display 64. Any number of suitable mounting techniques may be employed to mount display 64, throttle assembly 80, and button assemblies 82-1, 84-1, 86-1, and 86-1 to interior surface 130 of upper shroud 70.

Figure 5C:
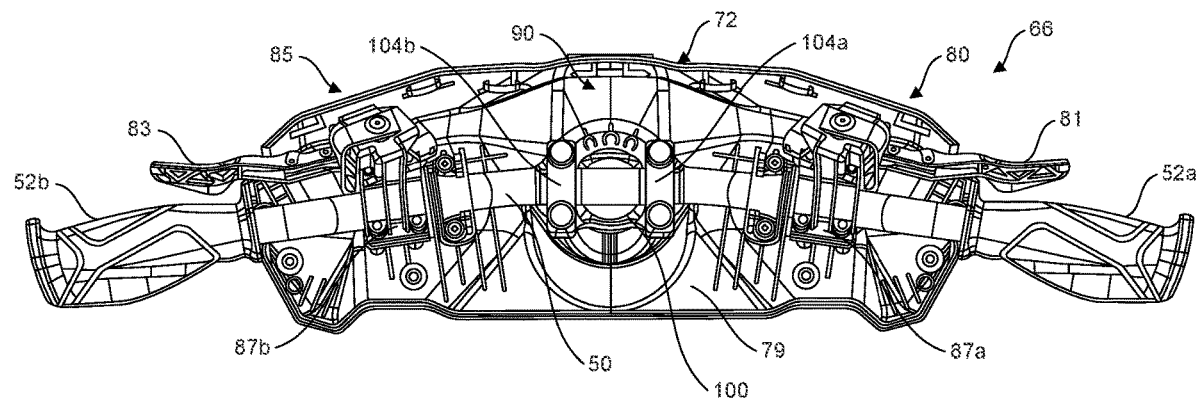
FIG. 5C illustrates a top view of a lower shroud, according to one example.

In an alternative embodiment shown with reference to FIG. 5C, throttle assembly 80 and brake-reverse assembly 85 are mounted to handlebar 50. Clamps 87a and 87b are used to selectively attach throttle assembly 80 and brake-reverse assembly 85 to handlebar 50 so that they are housed within the interior volume 79 of control console 60 when the upper shroud 70 is attached to the lower shroud 72. Mounting these two control mechanisms 66 to the handlebar 50 provides a solid mounting that is less prone to deformation during riding.

In examples, as described below (see FIG. 6), power and control wiring corresponding to display 64 and control mechanisms 66 (e.g., button assemblies 82-1, 84-1, 86-1, and 88-1) terminate in a plurality of wiring connectors which, in-turn, connect to corresponding wiring connectors of one or more power and control wiring harnesses that extend from interior volume 22 of PWC 10, through hollow steering column 42, and into interior volume 79 of control console 60 (see FIG. 2B). As a result, the wiring connectors connecting control console 60 to control system components disposed within interior volume 22 of PWC are located within control console 60. Together, upper shroud 70, control mechanisms 66 and their corresponding wiring/connectors form an upper shroud assembly 70-1 that can be selectively mounted to and removed as a unit from lower shroud 72.

Figure 6:
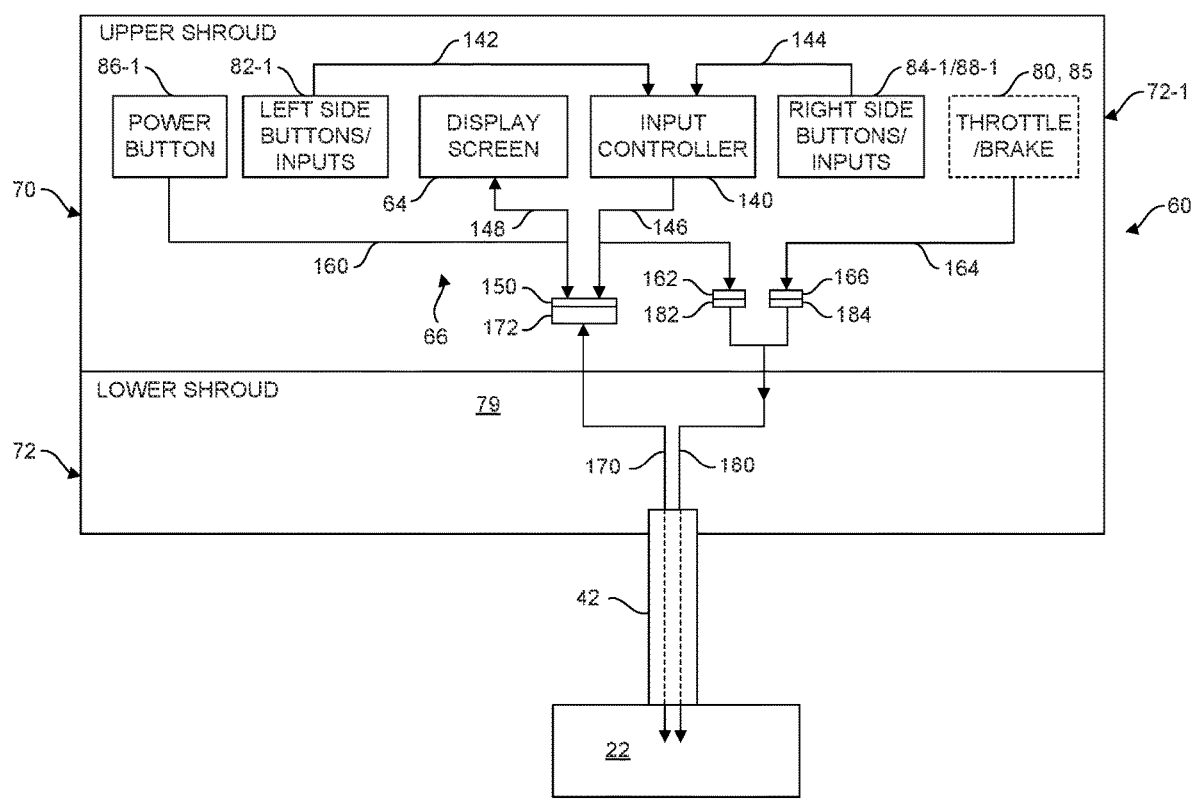
FIG. 6 is a block and schematic wiring diagram of a control console, according to one example.

FIG. 6 is a block and schematic wiring diagram of control console 60, according to one example. According to the illustrated example, left-hand side button assembly 82-1 and right-hand side button assemblies 84-1 and 88-1 are respectively electrically connected to input controller 140 via conductors 142 and 144. Input controller 140 converts inputs from button assemblies 82-1, 84-1, and 88-1 to a data format compatible with a control network employed by PWC 10, such as a CAN network, and outputs the control data via conductors 146 terminating in a wire connector 150. In one example, instead of separate input controller 140, the functionality of input controller 140 is included within one of button assemblies 82-1, 84-1 and 88-1, such as right-hand side button assembly 84-1, 88-1. In one example, inputs/outputs to and from display screen 64 are transmitted via conductors 148, with conductors 148 also terminating in wire connector 150. In one example, conductors 160 for button assembly 86-1 terminate in a wire connector 162, and conductors for throttle assembly 80 terminate in a wire connector 166.

In one example, a first wiring harness 170 represents a CAN bus extends from interior volume 22 of PWC 10 through an interior of hollow steering column 42 and into interior volume 79 of control console 60. First wiring harness 170 terminates in a wire connector 172 which is selectively connectable to wire connector 150. A second wiring harness 180 also extends from interior volume 22 of PWC 10 through the interior of hollow steering column 42 and into interior volume 79 of control console 60. In one example, second wiring harness terminates in wire connectors 182 and 184 which respectively connect to wire connectors 162 and 166. In one example, second wiring harness is associated with controller 56 disposed with interior volume 22 of PWC 10 (see FIG. 1B). In examples, the wire connectors, such as wire connectors 150, 162, 166, 172, 182, and 184 may comprise any suitable type of connector, including environmentally sealed connectors, such as Deutsch DTM-Series multi-pin connectors, for example. It is noted that the wiring configuration of FIG. 6 is included for illustrative purposes, and that any number of suitable wiring configurations and arrangements may be employed in addition to that shown.

Figure 7:
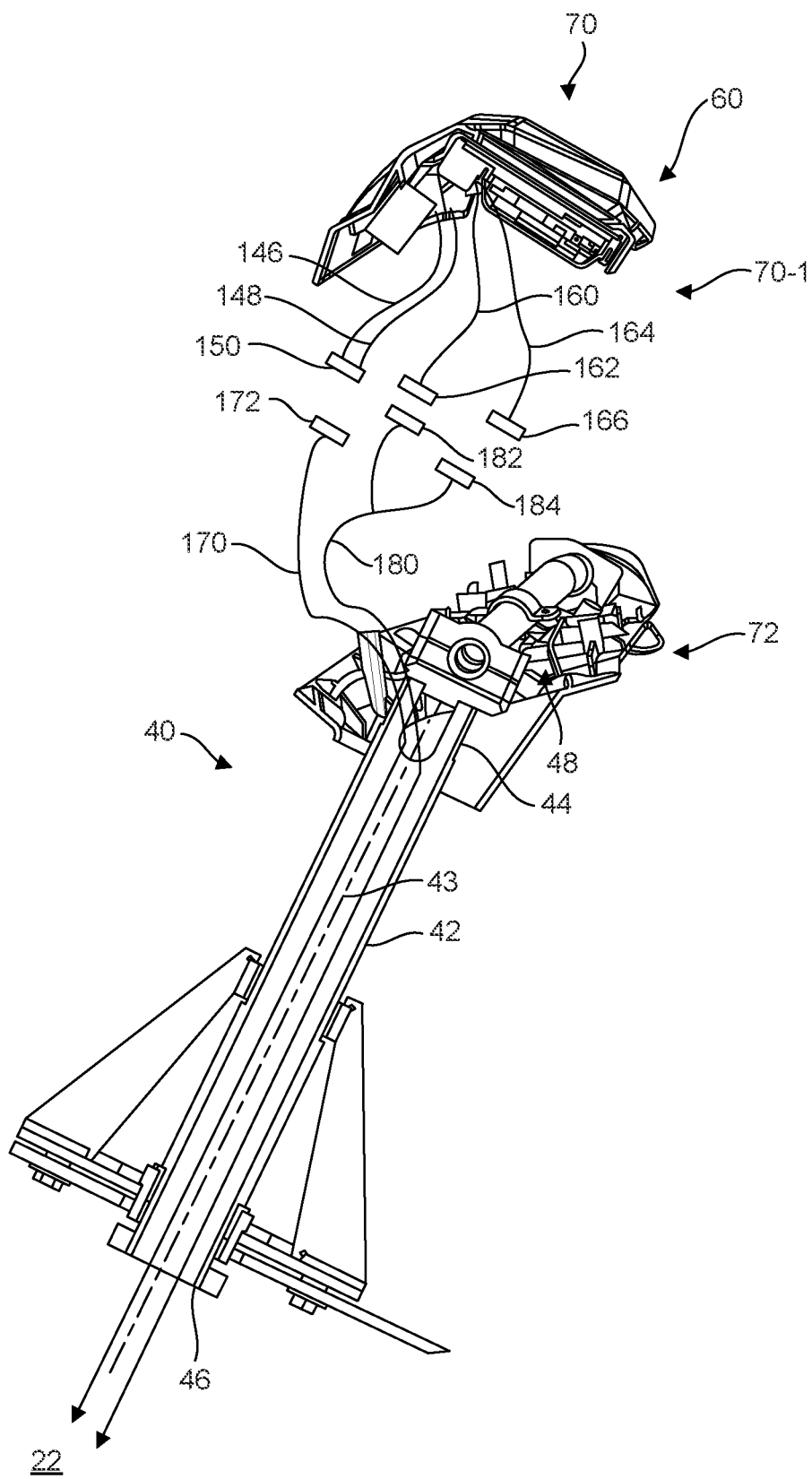
FIG. 7 is a cross-sectional view generally illustrating a control console mounted to a steering column of a steering assembly, according to one example.

FIG. 7 is a cross-sectional view generally illustrating control console 60 mounted to steering column 42 of steering assembly 40, according to one example. Lower shroud 72 is coupled to handlebar assembly 48 at distal end 44 of steering column 42, and upper shroud 70 is illustrated as being removed from lower shroud 72. As illustrated, first and second wiring harnesses 170 and 180 extend through hollow steering column 42, exit via proximal end 44 at lower shroud 72, and respectively terminate in wire connectors 172 and 184. Conductors 146, 148, 160, and 164 corresponding to control mechanisms 66 mounted to upper shroud 70, and/or to handlebars 50, respectively terminate in wire connectors 150, 162, and 166. When installing upper shroud 70 on lower shroud 72, wire connector 150 is connected to wire connector 172, wire connector 162 is connected to wire connector 182, and wire connector 166 is connected to wire connector 184. Upper shroud 70 is then positioned on lower shroud 72 and selective attached thereto via fasteners 74 (e.g., see FIG. 2B) which extend through lower shroud 72 and into upper shroud 70, such that wire connectors 150, 162, 166, 172, 182, and 184 are disposed within interior volume 79 of control console 60. The above process is reversed to remove upper shroud 70 from lower shroud 72.

In examples, during assembly, first and second wiring harnesses 170 and 180 are passed through steering column 42 such that wire connectors 172, 182, and 184 extend from proximal end 44. With reference to FIG. 3B, handlebar 50 is then attached to lower shroud 72 via clamps 106a and 106b, and handlebar assembly 48 and lower shroud 72 are attached to proximal end 44 of steering column 42 via handlebar 50 using handlebar mount 100 and handlebar brackets 104a and 104b. In examples, display 64, throttle assembly 80, brake-reverse assembly 85, and button assemblies 82-1, 84-1, 86-1, and 88-1 are mounted to upper shroud 70 and/or handlebars 50, along with conductors 146, 148, 160, and 164 and wire connectors 150, 162, and 166 to form upper shroud assembly 70-1. Wire connectors 150, 162, and 166 are then respectively connected to wire connectors 172, 182, and 184 and upper shroud assembly 70 is selectively attached to lower shroud 72. In this manner, the upper shroud assembly 70, the display 64, throttle assembly 80, and button assemblies 82, 84, 86, and 88 may be pre-assembled and relatively quickly and easily attached to the lower shroud 72 and first and second wiring harnesses 170, 180 during manufacturing. Similarly, in the case of damage or need for repair, the upper shroud assembly 70 may be detached from the lower shroud 72 and the wire connectors 150, 162, and 166 can be disconnected from wire connectors 172, 182, and 184 so that the upper shroud assembly 70, together with the display 64, throttle assembly 80, and button assemblies 82, 84, 86, and 88 can be removed from the PWC 10 relatively quickly and easily.

Figure 8:
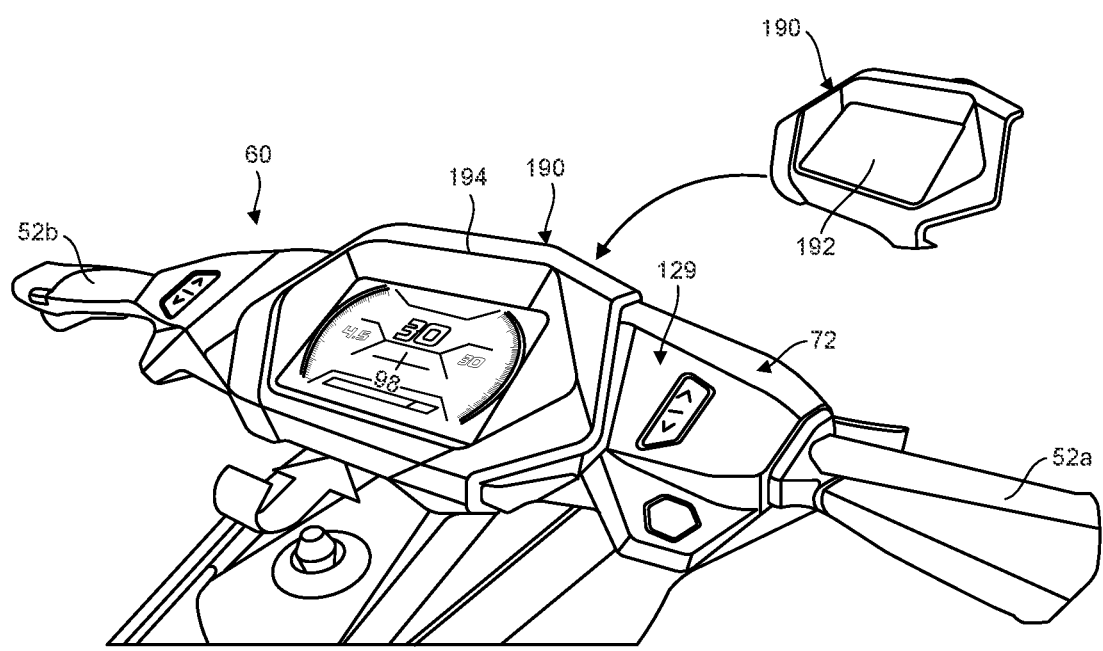
FIG. 8 is a perspective view of a control console including a padded cover, according to one example.

FIG. 8 is a perspective view of control console 60 further including a padded cover 190, according to one example. The padded cover 190 may be sold together with PWC 10 or may be a separate accessory. It is noted that in FIG. 8, padded cover 190 is illustrated in both an installed position on housing 62 and in an uninstalled position. In examples, padded cover 190 includes an opening 192 extending there through such that when padded cover 190 is selectively installed on exterior surface 129 of upper shroud 72 of housing 62, opening 192 frames display screen 64. In examples, as illustrated, padded cover 190 selectively snap-fits over housing 62, but may be selectively attached to housing 62 using any number of suitable techniques. In examples, padded cover 190 covers a generally central portion of upper shroud 72 of housing 62 surrounding the display screen 64, and does not extend as far as button consoles 82, 84 in the left and right directions towards the left and right handle grips 52a and 52b. In other examples, padded cover 190 may cover an entirety of the upper shroud 72. In still other examples, upper shroud 72 may comprise a padded surface such that padded cover 190 is unnecessary. In examples, padded 190 comprises a foam material, or other suitable compressible material, to protect riders of PWC 10 in case of impact. In examples, padded cover 190 further includes a sun visor 194 to reduce sun glare on display screen 64.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A control console for a personal watercraft, the console comprising:
   a console housing including:
   a lower shroud to couple to a handlebar of a steering assembly of the personal watercraft; and an upper shroud to couple to the lower shroud, the console housing to be disposed between opposing grip ends of the handlebar; and a display device mounted to the console housing and being externally visible, the display device to display information, including operational information of the personal watercraft.

2. The control console of claim 1, the display device comprising a digital display screen.

3. The control console of claim 1, the display device mounted to the upper shroud.

4. The control console of claim 3, further including a plurality of control devices to control operation of the personal watercraft.

5. The control console of claim 4, the plurality of control devices including a throttle control for controlling a propulsion system of the personal watercraft and one or more of control switches.

6. The control console of claim 4, the plurality of control devices mounted to the upper shroud.

7. The control console of claim 6, electrical wiring extending from the plurality of control devices and from the display device terminating in a plurality of wire connectors to be connected to corresponding wiring of the personal watercraft.

8. The control console of claim 7, the wire connectors connected to wire connectors of the corresponding wiring of the personal watercraft within an internal space of the console housing defined by the upper shroud and the lower shroud.

9. The control console of claim 4, further including a controller mounted to the upper shroud, the controller to convert outputs of a number of control devices to a control network format.

10. The control console of claim 1, the upper shroud selectively connected to the lower shroud via a plurality of fasteners extending through the lower shroud into the upper shroud.

11. The control console of claim 10, the plurality of fasteners comprising screws extending through the lower shroud into the upper shroud.

12. The console of claim 1, the lower shroud including an aperture to receive a steering column of the steering assembly.

13. The consoled of claim 1, including a removable padded cover selectively coupled to the upper shroud about the display device opening.

14. A personal watercraft comprising:
a hull;
a deck disposed on the hull;
a steering assembly including:
a steering column having a distal end disposed within the hull in operational communication with a propulsion system, and a proximal end extending from the deck; and
a handlebar mounted to the proximal end of the steering column between opposing grip ends of the handlebar; and
a control console including:
a lower shroud selectively coupled to the handlebar between the opposing grip ends, the lower shroud disposed between the handlebar and the deck;
an upper shroud selectively coupled to the lower shroud to form a console housing defining an interior space through which the handlebar passes; and a display device mounted to the upper shroud to display information including operating information of the personal watercraft.

15. The personal watercraft of claim 13, the control console movable with the handlebar about a longitudinally axis of the steering column.

16. The personal watercraft of claim 13, the lower shroud including an aperture through which the proximal end of the steering column extends, wherein the proximal end of the steering column is disposed within the interior space of the console housing, and wherein a handlebar mount is coupled to the proximal end of the steering column and the handlebar is mounted to the handlebar mount.

17. The personal watercraft of claim 13, the display device disposed at least partially within the interior space of the console housing with a display screen visible from an exterior surface of the upper shroud.

18. The personal watercraft of claim 14, the control console including a plurality of control devices mounted to an interior surface of the upper shroud facing the interior space of the console housing, the control devices accessible via corresponding openings extending through the upper shroud.

19. The personal watercraft of claim 14, the control devices and display device including electrical wiring which terminates in a plurality of waterproof wire connectors that selectively connect to wire connectors of corresponding wiring of the personal watercraft that extend into the interior space of the console housing via the steering column, such that connections between the wire connectors are disposed within the interior space.

20. A personal watercraft comprising:
a hull;
a deck disposed on the hull;
a steering assembly including:
a steering column having a distal end disposed within the hull in operational communication with a propulsion system, and a proximal end extending from the deck; and
a handlebar mounted to the proximal end of the steering column; and
a control console including:
a lower shroud disposed between the grip ends of the handlebar and the deck;
an upper shroud selectively coupled to the lower shroud to form a console housing, the console housing defining an interior space through which the handlebar passes; and
a plurality of electrical devices, including a display screen, mounted to the upper shroud, the electrical devices including electrical wiring which terminates in a plurality of wire connectors which selectively connect to wire connectors of corresponding wiring of the personal watercraft within the interior space of the of the console housing, such that the upper shroud and electrical devices can be selectively removed as a unit from the lower shroud.

21. The personal watercraft of claim 20, wherein the corresponding wiring of the personal watercraft extend through an interior of the steering column, such that the wire connectors of the corresponding wiring of the personal watercraft are disposed within the interior space of the control console.

* * * * *